United States Patent
Rock

(10) Patent No.: US 10,668,890 B2
(45) Date of Patent: Jun. 2, 2020

(54) AUTOMOBILE SEAT RESTRAINT SYSTEM AND METHOD

(71) Applicant: Winfield Rock, Bronx, NY (US)

(72) Inventor: Winfield Rock, Bronx, NY (US)

(*) Notice: Subject to any disclaimer, the term of this patent is extended or adjusted under 35 U.S.C. 154(b) by 0 days.

(21) Appl. No.: 16/251,583

(22) Filed: Jan. 18, 2019

(65) Prior Publication Data

US 2019/0217810 A1 Jul. 18, 2019

Related U.S. Application Data

(60) Provisional application No. 62/618,704, filed on Jan. 18, 2018.

(51) Int. Cl.
*B60R 22/02* (2006.01)
*B60R 22/12* (2006.01)
*B60R 22/10* (2006.01)

(52) U.S. Cl.
CPC .......... *B60R 22/105* (2013.01); *B60R 22/024* (2013.01); *B60R 22/12* (2013.01); *B60R 2022/027* (2013.01)

(58) Field of Classification Search
CPC ..... B60R 22/105; B60R 22/024; B60R 22/12; B60R 2022/027; B60R 2022/263; B60N 2/2851; B60N 2/265
See application file for complete search history.

(56) References Cited

U.S. PATENT DOCUMENTS

| | | | | |
|---|---|---|---|---|
| 3,158,399 A | * | 11/1964 | Pragnell | B60R 22/105 297/484 |
| 3,633,965 A | * | 1/1972 | Norman | B60R 22/02 297/484 |
| 3,834,758 A | * | 9/1974 | Soule | B60R 22/105 297/484 |
| 4,099,770 A | | 7/1978 | Elsholz et al. | |
| 4,226,474 A | * | 10/1980 | Rupert | A47D 15/006 297/465 |
| 6,116,696 A | | 9/2000 | Widman et al. | |
| 9,713,968 B1 | * | 7/2017 | Richardson | B60R 22/105 |
| 10,131,317 B1 | * | 11/2018 | Harrington | B60N 2/265 |
| 10,391,898 B1 | * | 8/2019 | Richards | B60N 2/686 |

(Continued)

FOREIGN PATENT DOCUMENTS

| CA | 2551335 A1 | * | 12/2006 | ........... B60N 2/2812 |
|---|---|---|---|---|
| DE | 2417816 A1 | * | 10/1975 | ........... B60R 22/105 |

(Continued)

*Primary Examiner* — Timothy J Brindley
(74) *Attorney, Agent, or Firm* — Boudwin Intellectual Property; Daniel Boudwin

(57) ABSTRACT

A system and method for securing a child in a typical adult-sized automobile seat are provided. The system includes a plurality of straps, or webbing, removably attached to the typical adult-sized automobile seat, an optional seat pad, two optional shoulder pads, two optional shoulder buckles, a chest buckle, and a hip buckle. The system is configured to safely and conveniently secure the child into the typical adult-sized automobile seat, thereby reducing or eliminating a need for a child-sized automobile seat. During use, the system secures the child into the typical adult-sized automobile seat, thereby preventing or ameliorating injury from an automobile collision.

20 Claims, 5 Drawing Sheets

(56) References Cited

U.S. PATENT DOCUMENTS

| | | | |
|---|---|---|---|
| 2006/0290192 A1* | 12/2006 | DeLellis | B60R 22/02 297/469 |
| 2007/0210639 A1 | 9/2007 | Berger et al. | |
| 2010/0164215 A1* | 7/2010 | Nezaki | B60R 21/18 280/808 |
| 2014/0021757 A1 | 1/2014 | Mo | |
| 2014/0300154 A1* | 10/2014 | Pfister | B60R 22/32 297/250.1 |
| 2015/0123449 A1* | 5/2015 | Crews | B60R 22/105 297/468 |
| 2017/0050611 A1* | 2/2017 | Farrugia | B60R 22/105 |
| 2017/0240134 A1* | 8/2017 | Hulitt | B60R 22/12 |
| 2018/0009408 A1* | 1/2018 | Brodie | A62B 35/0006 |
| 2019/0061680 A1* | 2/2019 | Wang | B60R 22/12 |
| 2019/0077364 A1* | 3/2019 | Murray, Sr. | B60R 22/023 |
| 2019/0084513 A1* | 3/2019 | Yamamoto | B60R 21/01548 |
| 2019/0126790 A1* | 5/2019 | Maciejczyk | B60R 22/105 |
| 2019/0135225 A1* | 5/2019 | Kim | B60R 22/20 |
| 2019/0263297 A1* | 8/2019 | Kealoha | B60N 2/885 |

FOREIGN PATENT DOCUMENTS

| | | | | |
|---|---|---|---|---|
| EP | 0646336 A1 * | 4/1995 | | B60R 22/30 |
| WO | WO-8002379 A1 * | 11/1980 | | B60N 2/4249 |
| WO | WO-0222406 A1 * | 3/2002 | | B60R 22/02 |
| WO | WO-2018189396 A1 * | 10/2018 | | B60N 2/24 |

\* cited by examiner

AUTOMOBILE SEAT RESTRAINT SYSTEM AND METHOD

CROSS REFERENCE TO RELATED APPLICATIONS

This application claims priority under 35 U.S.C. § 119(e) to U.S. Provisional Application No. 62/618,704 filed on Jan. 18, 2018. The above identified patent application is incorporated by reference herein in its entirety to provide continuity of disclosure.

BACKGROUND OF THE INVENTION

The present invention relates to an automobile seat restraint system for a child, and a method for securing the child in a typical adult-sized automobile seat.

Automobile seat restraint systems for children include child car seats and child booster seats. These systems are designed to protect a child from injury or death in the event of an automobile collision, but they are often inconvenient to use. For example, these systems occupy a large amount of space within an automobile, reducing space available for transport of additional objects and people. Further, installation and removal of these systems is difficult and time consuming, making it impractical for some users to install and remove these systems whenever a seating arrangement within the automobile changes.

Therefore, there is a need in the art for a safe and convenient automobile seat restraint system for a child. The present invention addresses this unmet need.

Systems have been disclosed in the art that relate to automobile seat restraint systems for children. These include items that have been patented and published in patent application publications. However, these devices are often inconvenient to use. In view of the systems disclosed in the art, it is submitted that there is a need in the art for an improvement to existing automobile seat restraint systems for children. In view of the present disclosure, it is submitted that the present invention substantially diverges in structural and functional elements from devices, systems, and methods in the art, and the present invention substantially fulfills an unmet need in the art.

SUMMARY OF THE INVENTION

In view of the disadvantages inherent in the known types of automobile child restraint systems in the art, the present invention provides a new and improved automobile seat restraint system for a child, wherein the same can be utilized for securing a child in a typical adult-sized automobile seat without a child car seat or a child booster seat.

It is therefore an object of the present invention to provide an automobile seat restraint system for a child.

Another object of the present invention is to provide a method for securing a child in a typical adult-sized automobile seat.

In one aspect, the invention provides an automobile seat restraint system for a child that does not include a child car seat, a child booster seat, or another type of automobile seat restraint system for the child. A specific advantage to the present invention includes the absence of these systems from the present invention, because these systems are often inconvenient to use, as discussed elsewhere herein. It is therefore a goal of the present invention to provide a safe, convenient, new, and useful system for restraining the child within a typical adult-sized automobile seat without requiring the child car seat, the child booster seat, or another type of automobile seat restraint system for the child.

In another aspect, the invention provides an automobile seat restraint system for a child, comprising: a left shoulder webbing removably attachable to an upper left portion of a typical adult-sized automobile seat by a first end thereon, and removably attachable to a lower left portion of the typical adult-sized automobile seat by a second end thereon; a right shoulder webbing removably attachable to an upper right portion of the typical adult-sized automobile seat by a first end thereon, and removably attachable to a lower right portion of the typical adult-sized automobile seat by a second end thereon; a central hip webbing removably attachable to a lower central portion of the typical adult-sized automobile seat by a first end thereon, and attached to a central hip buckle receiver by a second end thereon. The left shoulder webbing comprises a left chest buckle slidably disposed thereon, and a left hip buckle slidably disposed thereon, and the left chest buckle is closer to the first end of the left shoulder webbing than the left hip buckle. The right shoulder webbing comprises a right chest buckle slidably disposed thereon, and a right hip buckle slidably disposed thereon, and the right chest buckle is closer to the first end of the right shoulder webbing than the right hip buckle. The left chest buckle is removably attachable to the right chest buckle, the left hip buckle is removably attachable to the central hip buckle receiver, and the right hip buckle is removably attachable to the central hip buckle receiver.

In another aspect, the invention provides a method for securing a child in a typical adult-sized automobile seat comprising the automobile seat restraint system for a child, comprising: placing the child onto the typical adult-size automobile seat; placing the left shoulder webbing in front of a left shoulder of the child; placing the right shoulder webbing in front of a right shoulder of the child; placing the central hip webbing in front of a hip of the child; attaching the left chest buckle to the right chest buckle; attaching the left hip buckle to the central hip buckle receiver; attaching the right hip buckle to the central hip buckle receiver.

Other objects, features and advantages of the present invention will become apparent from the following detailed description taken in conjunction with the accompanying drawings.

BRIEF DESCRIPTIONS OF THE DRAWINGS

Although the characteristic features of the invention will be particularly pointed out in the claims, the invention itself and manners in which it may be made and used may be better understood after a review of the following description, taken in connection with the accompanying drawings, wherein like numeral annotations are provided throughout.

DETAILED DESCRIPTION OF THE INVENTION

Figure 1:
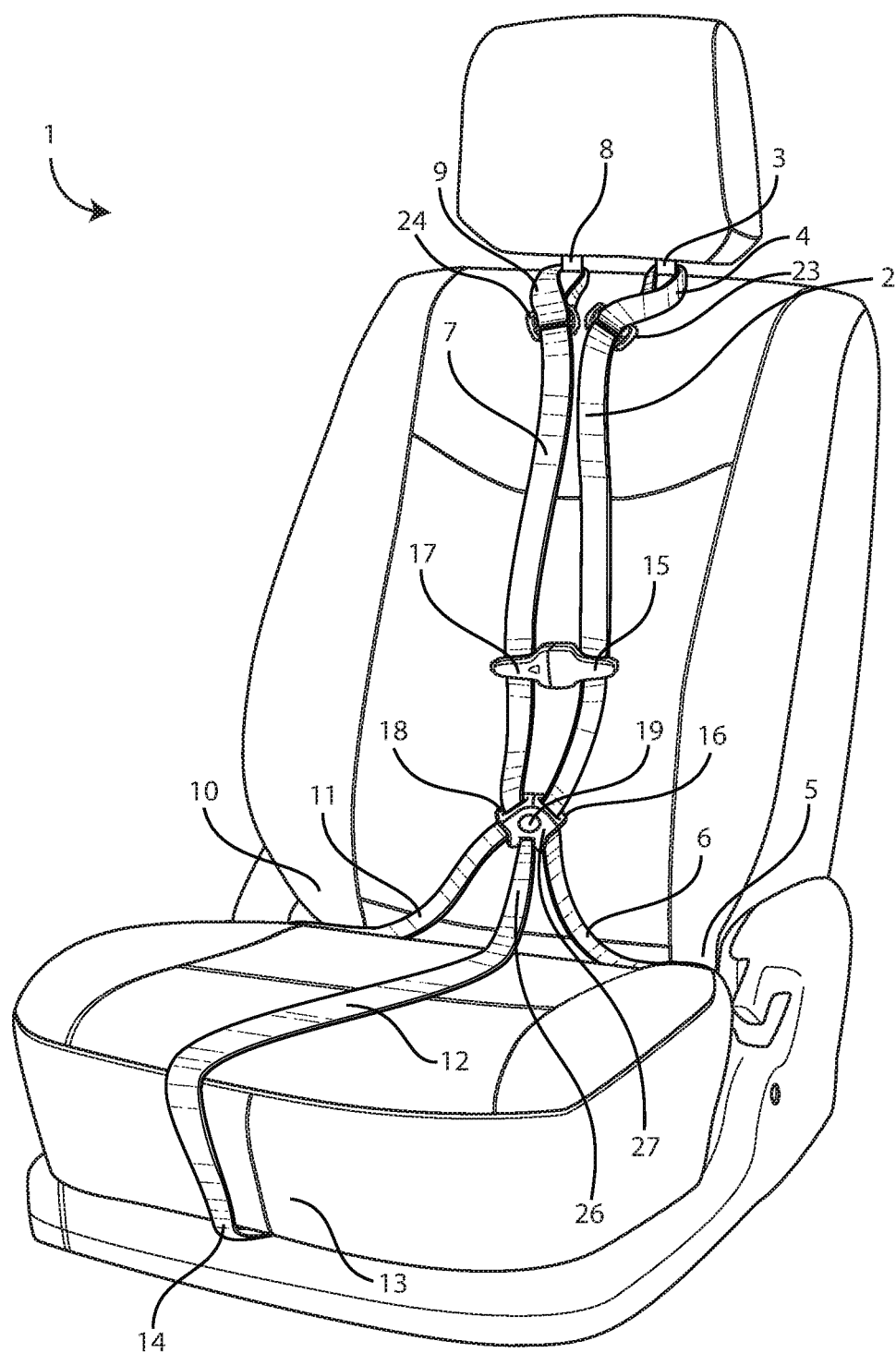
FIG. 1 depicts a perspective view of a first embodiment of an automobile seat restraint system.

Reference is made herein to the attached drawings. Like reference numerals are used throughout the drawings to depict like or similar elements of the invention. The figures are intended for representative purposes only and should not be considered limiting in any respect.

Reference is now made to the drawings, which depict one or more exemplary embodiments of the invention.

Referring now to FIG. 1, there is depicted a perspective view of a first embodiment of an automobile seat restraint system. The automobile seat restraint system 1 includes a left shoulder webbing 2 removably attachable to an upper left portion 3 of a typical adult-sized automobile seat at a first end 4 of the left shoulder webbing 2, and removably attachable to a lower left portion 5 of the typical adult-sized automobile seat at a second end 6 of the left shoulder webbing 2. The automobile seat restraint system 1 includes a right shoulder webbing 7 removably attachable to an upper right portion 8 of the typical adult-sized automobile seat at a first end 9 of the right shoulder webbing 7, and removably attachable to a lower right portion 10 of the typical adult-sized automobile seat at a second end 11 of the right shoulder webbing 7. The automobile seat restraint system 1 includes a central hip webbing 12 removably attachable to a lower central portion 13 of the typical adult-sized automobile seat at a first end 14 of the central hip webbing 12 and attached to a central hip buckle receiver 27 at a second end 26 of the central hip webbing 12. The left shoulder webbing 2 comprises a left chest buckle 15 slidably disposed thereon, and a left hip buckle 16 slidably disposed thereon, wherein the left chest buckle 15 is positioned closer to the first end 4 of the left shoulder webbing 2 than the left hip buckle 16. The right shoulder webbing 7 comprises a right chest buckle 17 slidably disposed thereon, and a right hip buckle 18 slidably disposed thereon, wherein the right chest buckle 17 is positioned closer to the first end 9 of the right shoulder webbing 7 than the right hip buckle 18. The left chest buckle 15 is removably attachable to the right chest buckle 17, the left hip buckle 16 is removably attachable to the central hip buckle receiver, and the right hip buckle 18 is removably attachable to the central hip buckle receiver. In the shown embodiment, the automobile seat restraint system 1 is installed onto the typical adult-sized automobile seat and is in a fully attached configuration.

The central hip buckle receiver 27 is configured to receive the left hip buckle 16 and the right hip buckle 18 to secure the system in the fully attached configuration. In some embodiments, the left hip buckle 16 comprises a left hip buckle tongue removably insertable into the central hip buckle receiver 27 to secure the left hip buckle 16 to the central hip buckle receiver 27, and the right hip buckle 18 comprises a right hip buckle tongue removably insertable into the central hip buckle receiver 27 to secure the right hip buckle 18 to the central hip buckle receiver 27. In the shown embodiment, the central hip buckle receiver 27 comprises a release button 19 configured to disengage the central hip buckle receiver 27 from the left hip buckle tongue and to disengage the central hip buckle receiver 27 from the right hip buckle tongue upon depression of the release button 19. In this manner, the central hip buckle receiver 27, the left hip buckle 16, and the right hip buckle 18 are configured to safely secure a child within the system in the fully attached configuration.

The left chest buckle 15 and the right chest buckle 17 are configured to connect to each other to secure the system in the fully attached configuration. In the shown embodiment, the left chest buckle 15 and the right chest buckle 17 are positioned at or below a middle of a back support portion of the typical adult-sized automobile seat. Generally, the middle of the back support portion of the typical adult-sized automobile seat may be at or near a vertical position that is about halfway up the back support portion, as measured from a seat portion of the typical adult-sized automobile seat, as would be understood by a person having ordinary skill in the art. In this manner, the left chest buckle 15 and the right chest buckle 17 are configured to safely secure the child within the system in the fully attached configuration.

In the shown embodiment, the automobile seat restraint system 1 is configured to be easily removed from the typical adult-sized automobile seat by two shoulder webbing buckles disposed on the upper ends of the shoulder webbing. In the shown embodiment, the first end 4 of the left shoulder webbing 2 includes a left shoulder webbing buckle receiver loop and comprises a left shoulder webbing buckle 23 disposed thereon. In the shown embodiment, the first end 9 of the right shoulder webbing 7 includes a right shoulder webbing buckle receiver loop and comprises a right shoulder webbing buckle 24 disposed thereon. In the shown embodiment, the left shoulder webbing buckle 23 is removably attached to a left shoulder webbing buckle receiver, and the left shoulder webbing buckle receiver is secured to the upper left portion 3 of the typical adult-sized automobile seat by the left shoulder webbing buckle receiver loop 4. In the shown embodiment, the right shoulder webbing buckle 24 is removably attached to a right shoulder webbing buckle receiver, and the right shoulder webbing buckle receiver is secured to the upper right portion 8 of the typical adult-sized automobile seat by a right shoulder webbing buckle receiver loop 9. In this manner, the left shoulder webbing 2 and the right shoulder webbing 7 are configured to be easily removed from the upper left portion 3 and the upper right portion 8 of the typical adult-sized automobile seat.

In the shown embodiment, the automobile seat restraint system 1 is removably attached to two head rest support pins. In the shown embodiment, the upper left portion 3 of the typical adult-sized automobile seat comprises a head rest left support pin, and the upper right portion 9 of the typical adult-sized automobile seat comprises a head rest right support pin. In the shown embodiment, the head rest left and right support pins are attached at upper ends thereof to a head rest, and are attached at lower ends thereof to a back support portion of the typical adult-sized automobile seat. In this manner, the left shoulder webbing 2 and the right shoulder webbing 7 are secured to the upper left portion 3 and the upper right portion 8 of the typical adult-sized automobile seat.

Figure 2:
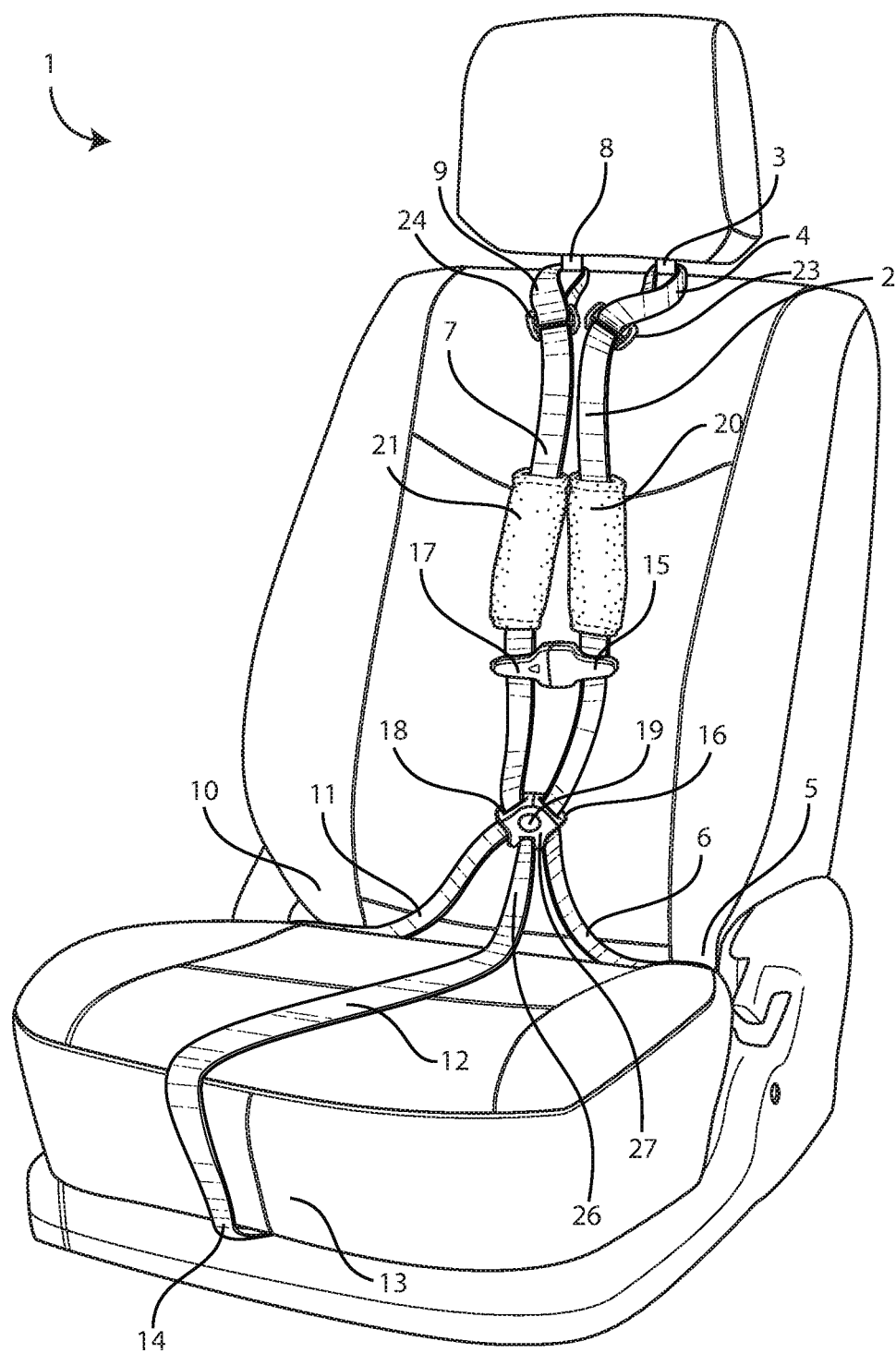
FIG. 2 depicts a perspective view of a second embodiment of the automobile seat restraint system.

Referring now to FIG. 2, there is depicted a perspective view of a second embodiment of the automobile seat restraint system. In the shown embodiment, the automobile seat restraint system includes all the features as the embodiment shown in FIG. 1. In addition, in the shown embodiment, the left shoulder webbing 2 comprises a left shoulder webbing pad 20 slidably disposed thereon, wherein the left shoulder webbing pad 20 is positioned closer to the first end 4 of the left shoulder webbing 2 than the left chest buckle 15. In addition, in the shown embodiment, the right shoulder webbing 7 comprises a right shoulder webbing pad 21 slidably disposed thereon, wherein the right shoulder webbing pad 21 is positioned closer to the first end 9 of the right shoulder webbing 7 than the right chest buckle 17. In this manner, the system is configured to reduce a discomfort of the child by reducing a friction on a skin of the child originating from the left shoulder webbing 2 and the right shoulder webbing 7 in the absence of the left shoulder webbing pad 20 and the right shoulder webbing pad 21.

Figure 3:
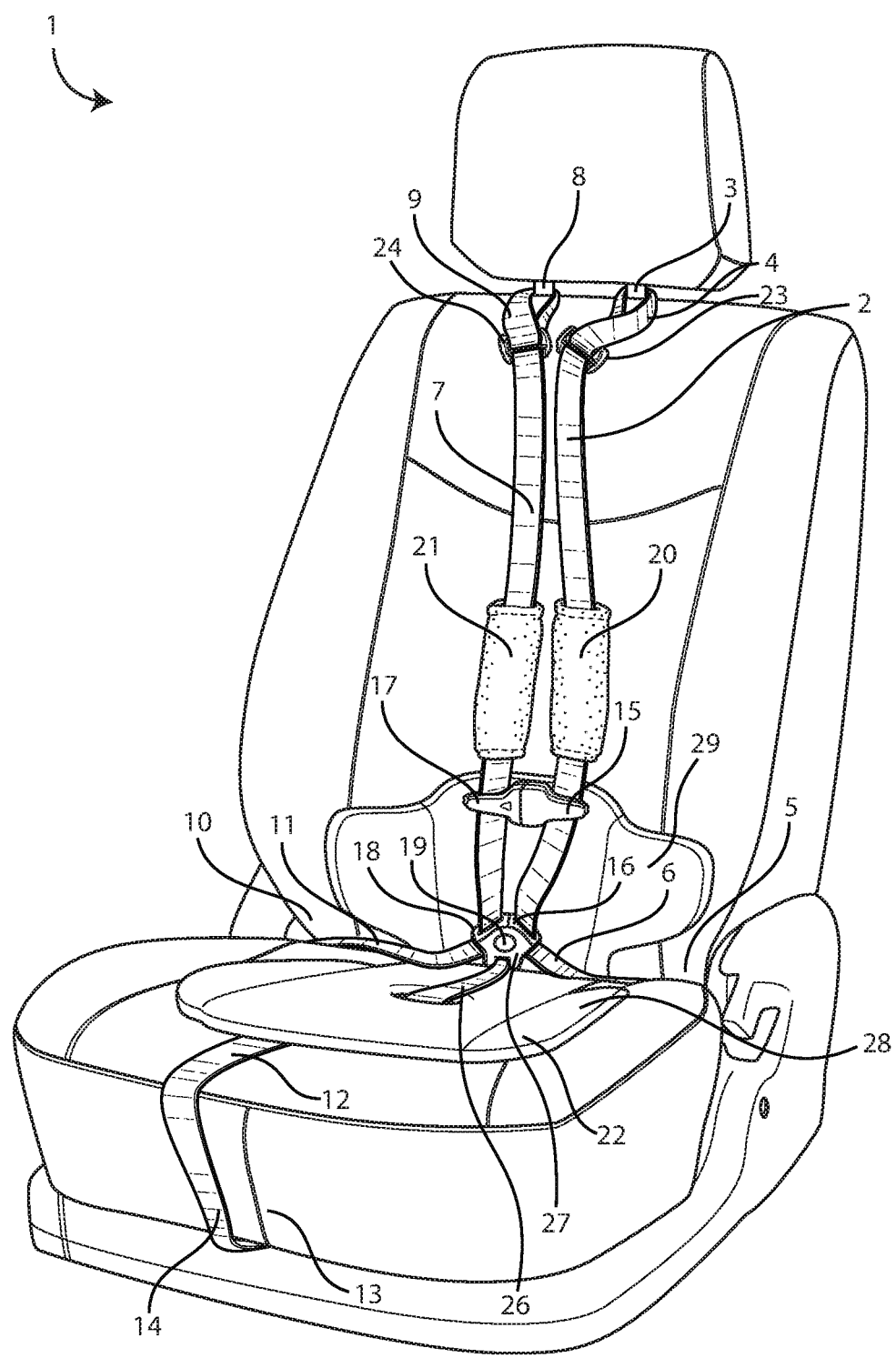
FIG. 3 depicts a perspective view of a third embodiment of the automobile seat restraint system.

Referring now to FIG. 3, there is depicted a perspective view of a third embodiment of the automobile seat restraint system. In the shown embodiment, the automobile seat restraint system includes all the features as the embodiment shown in FIG. 1. In addition, in the shown embodiment, the central hip webbing 12 comprises a central hip webbing pad 22 slidably disposed thereon, wherein the central hip webbing pad 22 comprises a seat portion 28 configured to rest against the seat portion of the typical adult-sized automobile seat, and comprises a back support portion 29 configured to rest against a back support portion of the typical adult-sized automobile seat. In this manner, the system is configured to reduce a discomfort of the child originating from the seat portion of the typical adult-sized automobile seat or the back portion of the typical adult-sized automobile seat.

Figure 4:
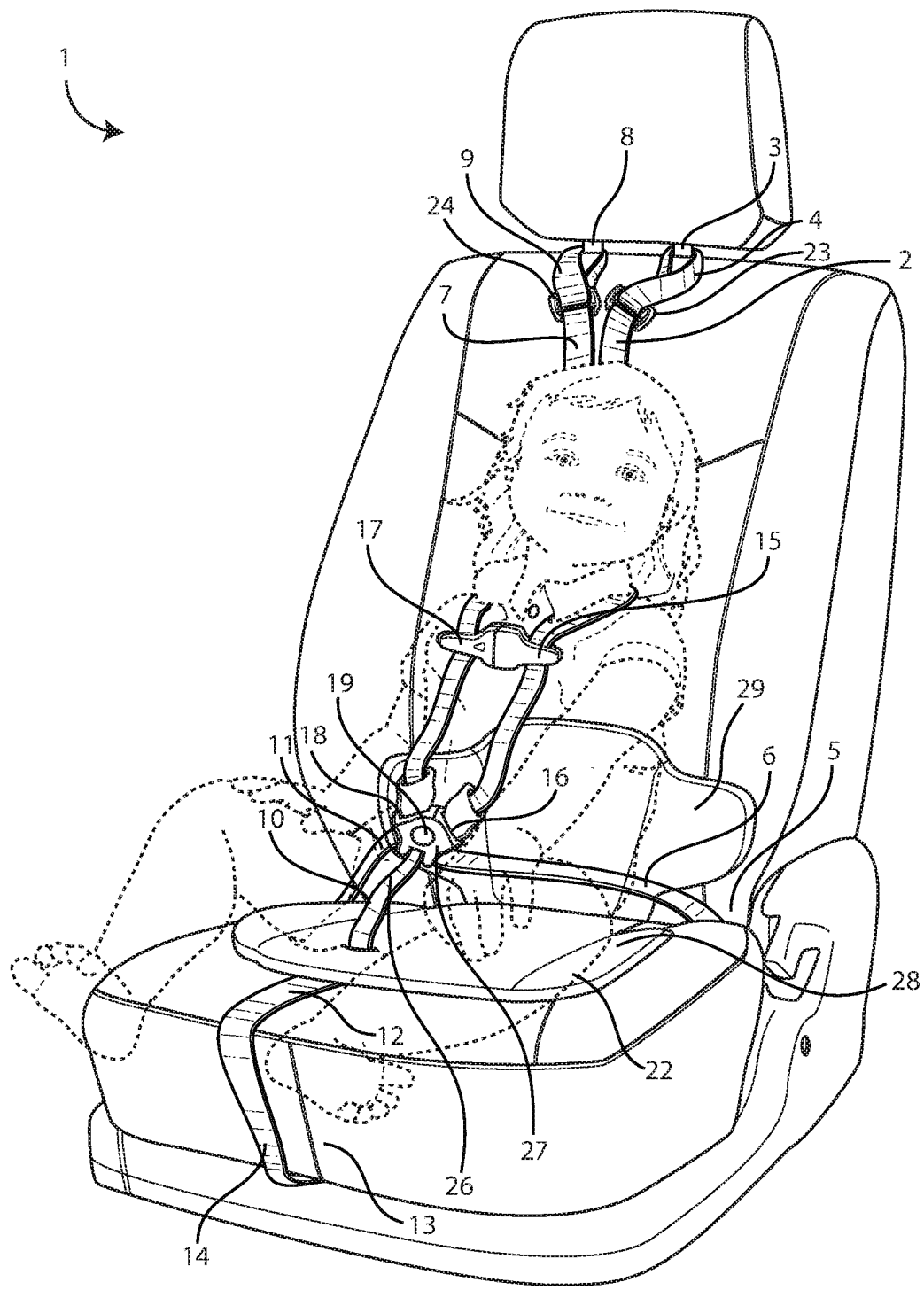
FIG. 4 depicts a perspective view of an embodiment of the automobile seat restraint system in use.

Referring now to FIG. 4, there is depicted a perspective view of an embodiment of the automobile seat restraint system in use. In the shown embodiment, the child is secured in the typical adult-sized automobile seat by placing the child onto the typical adult-size automobile seat, wherein the typical adult-size automobile seat comprises the automobile seat restraint system for a child as disclosed herein. After placing the child onto the typical adult-size automobile seat, the child is secured in the system by placing the left shoulder webbing 2 in front of a left shoulder of the child; placing the right shoulder webbing 7 in front of a right shoulder of the child; placing the central hip webbing 12 in front of a hip of the child; attaching the left chest buckle 15 to the right chest buckle 17; attaching the left hip buckle 16 to the central hip buckle receiver; and attaching the right hip buckle 18 to the central hip buckle receiver. In this manner, the system 1 is secured to the typical adult-size automobile seat, and the child is secured to the typical adult-size automobile seat by the system 1.

Figure 5:
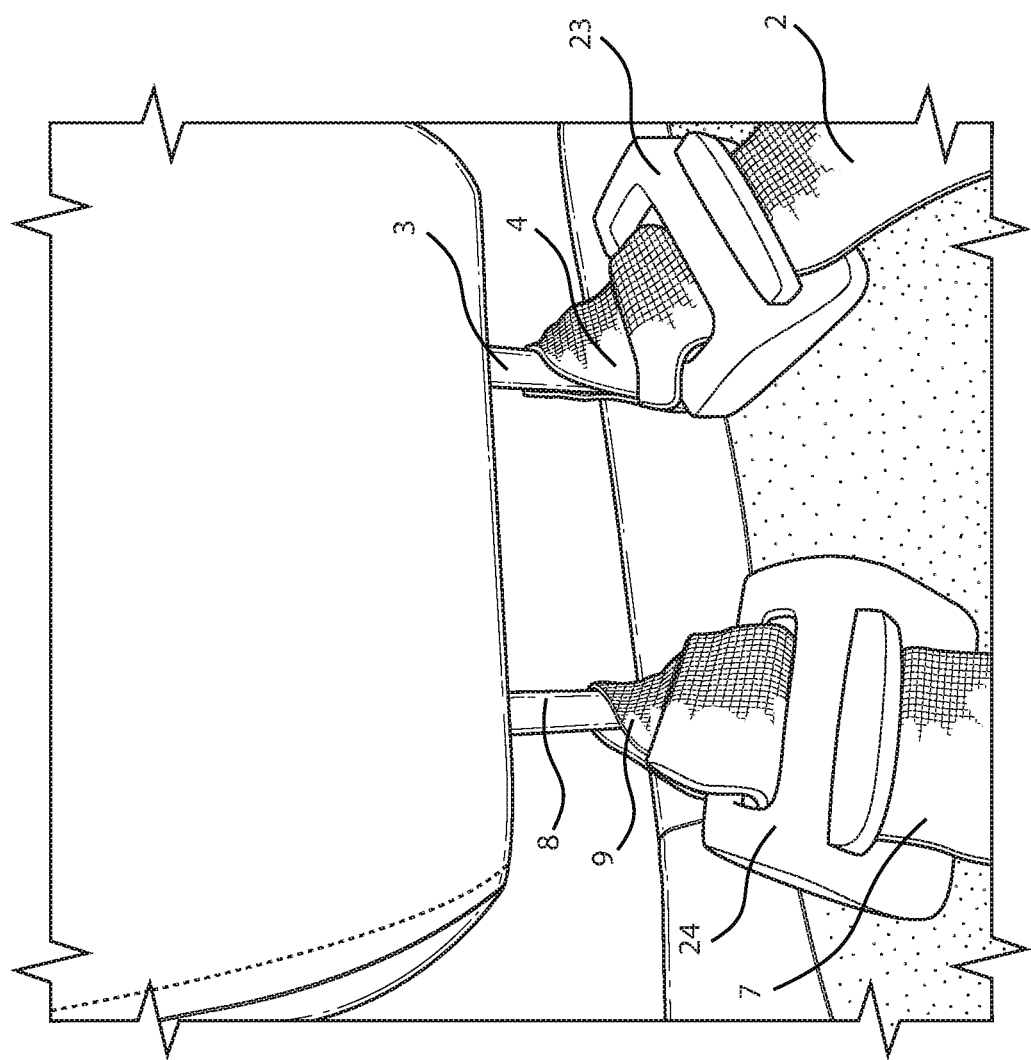
FIG. 5 depicts a close-up perspective view of upper attachment sites of an embodiment of the automobile seat restraint system.

Referring now to FIG. 5, there is depicted a close-up perspective view of upper attachment sites of an embodiment of the automobile seat restraint system. The shown embodiment depicts a close-up perspective view of some features depicted in FIG. 1. The first end 4 of the left shoulder webbing 2 is looped around the upper left portion 3 of the typical adult-sized automobile seat, which includes the head rest left support pin. The first end 9 of the right shoulder webbing 7 is looped around the upper right portion 8 of the typical adult-sized automobile seat, which includes the head rest right support pin. The buckles 23 and 24 may be slide-adjust buckles, wherein a diameter of the attachment loops may be adjusted by using the buckles 23 and 24, and the automobile seat restraint system may be removed from the typical adult-sized automobile seat by removing the head rest from the seat. Alternatively, the buckles 23 and 24 may removably connect the attachment loops to the rest of the left shoulder webbing 2 and the rest of the right shoulder webbing 7, wherein the diameter of the attachment loops may be fixed, and the automobile seat restraint system may be removed from the typical adult-sized automobile seat by engaging the buckles 23 and 24, as would be understood by a person having ordinary skill in the art.

The foregoing descriptions of specific embodiments of the present invention have been presented for purposes of illustration and description. They are not intended to be exhaustive or to limit the present invention to the precise forms disclosed, and modifications and variations are possible in view of the above teaching. The exemplary embodiment was chosen and described to best explain the principles of the present invention and its practical application, to thereby enable others skilled in the art to best utilize the present invention and its embodiments with modifications as suited to the use contemplated.

It is therefore submitted that the instant invention has been shown and described in the most practical and exemplary embodiments. It should be recognized that departures may be made which fall within the scope of the invention. With respect to the description provided herein, it is submitted that the optimal features of the invention include variations in size, materials, shape, form, function and manner of operation, assembly, and use. All structures, functions, and relationships equivalent or essentially equivalent to those disclosed are intended to be encompassed by the present invention.

I claim:

1. An automobile seat restraint system for a child, comprising:
   a left shoulder webbing removably attachable to an upper left portion of a typical adult-sized automobile seat at a first end of the left shoulder webbing, and removably attachable to a lower left portion of the typical adult-sized automobile seat at a second end of the left shoulder webbing;
   a right shoulder webbing removably attachable to an upper right portion of the typical adult-sized automobile seat at a first end of the right shoulder webbing, and removably attachable to a lower right portion of the typical adult-sized automobile seat at a second end of the right shoulder webbing;
   a central hip webbing removably attachable to a lower central portion of the typical adult-sized automobile seat at a first end of the central hip webbing, and attached to a central hip buckle receiver at a second end of the central hip webbing;
   wherein the left shoulder webbing comprises a left chest buckle slidably disposed thereon, and a left hip buckle slidably disposed thereon, wherein the left chest buckle is positioned closer to the first end of the left shoulder webbing than the left hip buckle;
   wherein the right shoulder webbing comprises a right chest buckle slidably disposed thereon, and a right hip buckle slidably disposed thereon, wherein the right chest buckle is positioned closer to the first end of the right shoulder webbing than the right hip buckle;
   wherein the left chest buckle is removably attachable to the right chest buckle;
   wherein the left hip buckle is removably attachable to the central hip buckle receiver;
   wherein the right hip buckle is removably attachable to the central hip buckle receiver.

2. The system of claim 1, wherein the left hip buckle comprises a left hip buckle tongue removably insertable into the central hip buckle receiver to secure the left hip buckle to the central hip buckle, wherein the right hip buckle comprises a right hip buckle tongue removably insertable into the central hip buckle receiver to secure the right hip buckle to the central hip buckle.

3. The system of claim 2, wherein the central hip buckle receiver comprises a release button configured to disengage the central hip buckle receiver from the left hip buckle tongue and to disengage the central hip buckle receiver from the right hip buckle tongue upon depression of the release button.

4. The system of claim 1, wherein the left chest buckle and the right chest buckle are positioned at or below a middle of a back support portion of the typical adult-sized automobile seat.

5. The system of claim 1, wherein the left shoulder webbing comprises a left shoulder webbing pad slidably disposed thereon, wherein the left shoulder webbing pad is positioned closer to the first end of the left shoulder webbing than the left chest buckle, wherein the right shoulder webbing comprises a right shoulder webbing pad slidably disposed thereon, wherein the right shoulder webbing pad is positioned closer to the first end of the right shoulder webbing than the right chest buckle.

6. The system of claim 1, wherein the central hip webbing comprises a central hip webbing pad slidably disposed thereon, wherein the central hip webbing pad comprises a seat portion configured to rest against a seat portion of the typical adult-sized automobile seat, wherein the central hip webbing pad comprises a back support portion configured to rest against a back support portion of the typical adult-sized automobile seat.

7. The system of claim 1, wherein the first end of the left shoulder webbing comprises a left shoulder webbing buckle disposed thereon, wherein the first end of the right shoulder webbing comprises a right shoulder webbing buckle disposed thereon.

8. The system of claim 7, wherein the left shoulder webbing buckle is removably attachable to a left shoulder webbing buckle receiver, wherein the left shoulder webbing buckle receiver is secured to the upper left portion of the typical adult-sized automobile seat by a left shoulder webbing buckle receiver loop, wherein the right shoulder webbing buckle is removably attachable to a right shoulder webbing buckle receiver, wherein the right shoulder webbing buckle receiver is secured to the upper right portion of the typical adult-sized automobile seat by a right shoulder webbing buckle receiver loop.

9. The system of claim 8, wherein the upper left portion of the typical adult-sized automobile seat comprises a head rest left support pin, wherein the upper right portion of the typical adult-sized automobile seat comprises a head rest right support pin, wherein the left shoulder webbing buckle receiver loop is looped around the head rest left support pin, wherein the right shoulder webbing buckle receiver loop is looped around the head rest right support pin.

10. The system of claim 9, wherein an upper end of the head rest left support pin is attached to a head rest, wherein a lower end of the head rest left support pin is attached to a back support portion of the typical adult-sized automobile seat, wherein an upper end of the head rest right support pin is attached to the head rest, wherein a lower end of the head rest right support pin is attached to the back support portion of the typical adult-sized automobile seat.

11. A method for securing a child in a typical adult-sized automobile seat, comprising:
    placing the child onto the typical adult-size automobile seat, wherein the typical adult-size automobile seat comprises an automobile seat restraint system for a child comprising:
        a left shoulder webbing removably attachable to an upper left portion of a typical adult-sized automobile seat at a first end of the left shoulder webbing, and removably attachable to a lower left portion of the typical adult-sized automobile seat at a second end of the left shoulder webbing;
        a right shoulder webbing removably attachable to an upper right portion of the typical adult-sized automobile seat at a first end of the right shoulder webbing, and removably attachable to a lower right portion of the typical adult-sized automobile seat at a second end of the right shoulder webbing;
        a central hip webbing removably attachable to a lower central portion of the typical adult-sized automobile seat at a first end of the central hip webbing, and attached to a central hip buckle receiver at a second end of the central hip webbing;
        wherein the left shoulder webbing comprises a left chest buckle slidably disposed thereon, and a left hip buckle slidably disposed thereon, wherein the left chest buckle is positioned closer to the first end of the left shoulder webbing than the left hip buckle;
        wherein the right shoulder webbing comprises a right chest buckle slidably disposed thereon, and a right hip buckle slidably disposed thereon, wherein the right chest buckle is positioned closer to the first end of the right shoulder webbing than the right hip buckle;
        wherein the left chest buckle is removably attachable to the right chest buckle;
        wherein the left hip buckle is removably attachable to the central hip buckle receiver;
        wherein the right hip buckle is removably attachable to the central hip buckle receiver;
    placing the left shoulder webbing in front of a left shoulder of the child;
    placing the right shoulder webbing in front of a right shoulder of the child;
    placing the central hip webbing in front of a hip of the child;
    attaching the left chest buckle to the right chest buckle;
    attaching the left hip buckle to the central hip buckle receiver;
    attaching the right hip buckle to the central hip buckle receiver.

12. The method of claim 11, wherein the left hip buckle comprises a left hip buckle tongue removably insertable into the central hip buckle receiver to secure the left hip buckle to the central hip buckle, wherein the right hip buckle comprises a right hip buckle tongue removably insertable into the central hip buckle receiver to secure the right hip buckle to the central hip buckle.

13. The method of claim 12, wherein the central hip buckle receiver comprises a release button configured to disengage the central hip buckle receiver from the left hip buckle tongue and to disengage the central hip buckle receiver from the right hip buckle tongue upon depression of the release button.

14. The method of claim 11, wherein the left chest buckle and the right chest buckle are positioned at or below a middle of a back support portion of the typical adult-sized automobile seat.

15. The method of claim 11, wherein the left shoulder webbing comprises a left shoulder webbing pad slidably disposed thereon, wherein the left shoulder webbing pad is positioned closer to the first end of the left shoulder webbing than the left chest buckle, wherein the right shoulder webbing comprises a right shoulder webbing pad slidably disposed thereon, wherein the right shoulder webbing pad is positioned closer to the first end of the right shoulder webbing than the right chest buckle.

16. The method of claim 11, wherein the central hip webbing comprises a central hip webbing pad slidably disposed thereon, wherein the central hip webbing pad comprises a seat portion configured to rest against a seat portion of the typical adult-sized automobile seat, wherein the central hip webbing pad comprises a back support portion configured to rest against a back support portion of the typical adult-sized automobile seat.

17. The method of claim 11, wherein the first end of the left shoulder webbing comprises a left shoulder webbing buckle disposed thereon, wherein the first end of the right shoulder webbing comprises a right shoulder webbing buckle disposed thereon.

18. The method of claim 17, wherein the left shoulder webbing buckle is removably attachable to a left shoulder webbing buckle receiver, wherein the left shoulder webbing buckle receiver is secured to the upper left portion of the typical adult-sized automobile seat by a left shoulder webbing buckle receiver loop, wherein the right shoulder webbing buckle is removably attachable to a right shoulder webbing buckle receiver, wherein the right shoulder webbing buckle receiver is secured to the upper right portion of the typical adult-sized automobile seat by a right shoulder webbing buckle receiver loop.

19. The method of claim 18, wherein the upper left portion of the typical adult-sized automobile seat comprises a head rest left support pin, wherein the upper right portion of the typical adult-sized automobile seat comprises a head rest right support pin, wherein the left shoulder webbing buckle receiver loop is looped around the head rest left support pin, wherein the right shoulder webbing buckle receiver loop is looped around the head rest right support pin.

20. The method of claim 19, wherein an upper end of the head rest left support pin is attached to a head rest, wherein a lower end of the head rest left support pin is attached to a back support portion of the typical adult-sized automobile seat, wherein an upper end of the head rest right support pin is attached to the head rest, wherein a lower end of the head rest right support pin is attached to the back support portion of the typical adult-sized automobile seat.

\* \* \* \* \*